US006310112B1

(12) United States Patent
Vo et al.

(10) Patent No.: US 6,310,112 B1
(45) Date of Patent: Oct. 30, 2001

(54) HYDROGENATED VINYL AROMATIC POLYMER FOAMS

(75) Inventors: Chau Van Vo, Souffelweyersheim (FR); Jerry L. Hahnfeld, Midland, MI (US); Felix Achille, Midland, MI (US); Daniel D. Imeokparia, Midland, MI (US); George A. Mackey, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/713,408

(22) Filed: Nov. 15, 2000

Related U.S. Application Data

(60) Provisional application No. 60/169,459, filed on Dec. 7, 1999, and provisional application No. 60/224,433, filed on Aug. 10, 2000.

(51) Int. Cl.[7] ........................................................ C08J 9/00
(52) U.S. Cl. .................. 521/134; 521/139; 521/140; 521/144; 521/145; 521/146; 521/147; 521/149
(58) Field of Search ....................................... 521/139, 140, 521/134, 144, 146, 145, 147, 149

(56) References Cited

U.S. PATENT DOCUMENTS 4,847,150 * 7/1989 Takeda et al. ........................ 521/96

FOREIGN PATENT DOCUMENTS

| 1 460 621 | 1/1977 | (GB) . |
| 3234741 | 5/1991 | (JP) . |
| 06 345914 | 4/1995 | (JP) . |
| 98/37131 | 8/1998 | (WO) . |

\* cited by examiner

*Primary Examiner*—Morton Foelak

(57) ABSTRACT

This invention provides a thermoplastic polymer foam having a density of up to 800 kg/m$^3$. The foam is made from a hydrogenated vinyl aromatic polymer that contains pendant cycloaliphatic groups. This polymer is conveniently made by hydrogenating a poly(vinyl aromatic) polymer such as polystyrene or a polystyrene-butadiene block copolymer. A suitable blowing agent is a mixture comprising (a) one or more fluorine-containing carbon compounds and (b) carbon dioxide, nitrogen, an alcohol having from 1 to 4 carbon atoms, a linear or cyclic hydrocarbon having from 1 to 6 carbon atoms, a ketone, an alkyl ether, an alkyl halide, water or a mixture thereof.

19 Claims, No Drawings

HYDROGENATED VINYL AROMATIC POLYMER FOAMS

CROSS REFERENCE STATEMENT

This application claims the benefit of U.S. Provisional Application No. 60/169,459, filed Dec. 7, 1999 and U.S. Provisional Application No. 60/224,433, filed Aug. 10,2000.

BACKGROUND OF THE INVENTION

This invention relates to polymer foams from hydrogenated vinyl aromatic polymers.

Polystyrene insulation foam and polyethylene packaging foams are made in commercial quantities using an extrusion process. However, commercial extrusion processes are not easily adapted for use with a wide variety of polymers. Thus, although polystyrene, LDPE (low density polyethylene made in a high pressure process) and some grades of polypropylene are readily processed through an extrusion process, many other common polymers, notably LLDPE (linear low density polyethylene) and HDPE (high density polyethylene), can be extruded into foam with difficulty, if at all. Additionally, these foams have insufficient heat resistance for many applications, such as adiabatic thermal insulation and other applications requiring heat resistance at polymer softening temperatures.

JP-03234741 of Hitachi discloses bead expansion molding (bead stock foam) of a polyvinylcyclohexane resin, having good heat resistance and weatherability. The polymers disclosed include vinylcyclohexane homopolymer and copolymers thereof with fatty acid esters, cyanovinyl compounds, unsaturated dibasic acids, or unsaturated fatty acids.

It remains desirable to obtain other types of foams from hydrogenated aromatic polymers and foams from other copolymers of hydrogenated aromatic polymers.

SUMMARY OF THE INVENTION

In one aspect, the present invention relates to a foam of a thermoplastic poly(vinyl cycloaliphatic) polymer having pendant cycloaliphatic groups, alternatively referred to herein as a hydrogenated vinyl aromatic polymer, said foam having a thickness of at least 1 mm and a density of from 3 to 800 kg/m$^3$.

It has been discovered that good quality foam can be made easily from such hydrogenated polymers using conventional commercial scale foam equipment, such as extruders and cast rolls. The invention provides foam having good insulating performance, good mechanical properties and heat resistance.

DETAILED DESCRIPTION OF THE PREFERRED EMBODIMENTS

The foam of the present invention is prepared from a polymer having pendant cycloaliphatic groups. In this application, such polymers are referred to as hydrogenated vinyl aromatic polymers and can be prepared by hydrogenating polymers prepared by polymerizing at least one vinyl aromatic monomer.

Vinyl aromatic monomers used to prepare the polymers which are subsequently hydrogenated include, but are not limited to those described in U.S. Pat Nos. 4,666,987; 4,572,819 and 4,585,825, which are herein incorporated by reference. Preferably, the monomer is of the formula:

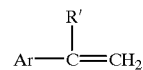

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. Homopolymers may have any stereostructure including syndiotactic, isotactic or atactic; however, atactic polymers are preferred.

In addition, a comonomer(s) can be polymerized with the vinyl aromatic monomer to prepare copolymers including random, pseudo random, block, e.g. diblock, triblock, pentablock, multi-block, star block, tapered block, radial block, including symmetrical and asymmetrical versions thereof; and grafted copolymers. For example, hydrogenated copolymers of at least one vinyl aromatic monomer(s) and at least one comonomer selected from: nitriles, acrylates, acids, ethylene, propylene, norbornenes, 1-butene and 1-octene, maleic anhydride, maleimides, vinyl acetate, and vinyl chloride may also be used. Exemplary copolymers include styrene-acrylonitrile, styrene-alpha-methylstyrene and styrene-ethylene. Block copolymers of vinyl aromatic monomers and conjugated dienes such as butadiene, isoprene may also be used. The conjugated diene monomer can be any monomer having 2 conjugated double bonds. Such monomers include for example 1,3-butadiene, 2-methyl-1, 3-butadiene, 2-methyl-1,3 pentadiene, isoprene and similar compounds, and mixtures thereof. Further examples of block copolymers may be found in U.S. Pat. Nos. 4,845,173; 4,096,203; 4,200,718; 4,210,729; 4,205,016; 3,652,516; 3,734,973; 3,390,207; 3,231,635 and 3,030,346. Blends of such polymers with other polymers including impact modified, grafted rubber containing aromatic polymers may also be utilized. In addition, the polymerization of the vinyl aromatic monomer may be conducted in the presence of predissolved elastomer to prepare impact modified, or grafted rubber containing products, examples of which are described in U.S. Pat. Nos. 3,123,655; 3,346,520; 3,639, 522; and 4,409,369, which are incorporated by reference herein.

In a preferred embodiment, the polymer is a vinyl aromatic-conjugated diene block copolymer, wherein the conjugated diene polymer block is chosen from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provide substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. The conjugated diene polymer block may also be a copolymer of a conjugated diene, wherein the conjugated diene portion of the copolymer is at least 50 weight percent of the copolymer.

The conjugated diene polymer block may also be a copolymer of more than one conjugated diene, such as a copolymer of butadiene and isoprene. Other polymeric blocks may also be included in the hydrogenated block copolymers used in the present invention.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32–38.

Block copolymers can be either rigid or flexible block copolymers, wherein rigid block copolymers are characterized by:

a) a weight ratio of hydrogenated conjugated diene polymer block to hydrogenated vinyl aromatic polymer block of 40:60 or less, typically from 40:60 to 5:95, preferably from 35:65 to 10:90, more preferably from 30:70 to 15:85, based on the total weight of the hydrogenated conjugated diene polymer block and the hydrogenated vinyl aromatic polymer block; and b) a total number average molecular weight ($M_{nt}$) of from 24,000 to 150,000, wherein each hydrogenated vinyl aromatic polymer block (A) has a $M_{na}$ of from 6,000 to 60,000 and each hydrogenated conjugated diene polymer block (B) has a $M_{nb}$ of from 3,000 to 30,000;

and flexible block copolymers are characterized by:

a) a weight ratio of hydrogenated conjugated diene polymer block to hydrogenated vinyl aromatic polymer block of greater than 40:60, typically of greater than 40:60 to 95:5, preferably from 45:55 to 90:10, more preferably from 50:50 to 85:15 and most preferably from 60:40 to 80:20, based on the total weight of the hydrogenated conjugated diene and hydrogenated vinyl aromatic polymer blocks; and b) a total number average molecular weight ($M_{nt'}$) of from 30,000 to 150,000, wherein each hydrogenated vinyl aromatic polymer block (A) has a $M_{na'}$ of from 5,000 to 45,000 and each hydrogenated conjugated diene polymer block (B) has a $M_{nb'}$ of from 12,000 to 110,000.

In block copolymers of the types just described, the hydrogenated vinyl aromatic polymer blocks and the hydrogenated conjugated diene polymer block(s) preferably together comprise at least 80 weight percent of the polymer, more preferably at least 90 weight percent, and more preferably at least 95 weight percent of the total weight of the copolymer.

Further examples of block copolymers that may be hydrogenated to form polymers suitable for use herein may be found in U.S. Pat. Nos. 4,845,173; 4,096,203; 4,200,718; 4,201,729; 4,205,016; 3,652,516; 3,734,973; 3,390,207; 3,231,635; and 3,030,346.

The hydrogenated vinyl aromatic polymer may be blended or grafted with impact modifiers, such as a natural or synthetic rubber.

The hydrogenated vinyl aromatic polymer has a molecular weight such that it is melt processable into a foam. In the general case, a suitable weight average molecular weight ($M_w$) for the hydrogenated vinyl aromatic homopolymer is at least 40,000 more preferably at least 50,000, most preferably at least 60,000; but preferably no greater than 600,000, more preferably no greater than 500,000, and most preferably no greater than 300,000. A suitable number average molecular weight ($M_n$) is at least 30,000, more preferably at least 40,000, most preferably at least 50,000; but preferably no greater than 300,000, more preferably no greater than 200,000, and most preferably no greater than 150,000. A suitable Z-average molecular weight ($M_z$) is at least 50,000, more preferably at least 60,000, most preferably at least 80,000; but preferably no greater than 1,000,000, more preferably no greater than 700,000, and most preferably no greater than 500,000. The polymer advantageously has a polydispersity index ($M_w/M_n$) of about 1.0 to about 10 and more preferably about 1.3 to about 7. The polymer preferably has a $M_z/M_w$ ratio of about 1.1 to about 5 and more preferably about 1.4 to about 4. Weight average molecular weight and Z-average molecular weight are both determined according to size exclusion chromatography (SEC) according to ASTM 5296-92, and number average molecular weight is determined using gel permeation chromatography (GPC).

For block copolymers made by hydrogenating a vinyl aromatic/conjugated diene block copolymer, the total number average molecular weight ($M_{nt}$) will generally be from 24,000, preferably from 30,000, more preferably from 40,000 and most preferably from 45,000 to 150,000, typically to 100,000, generally to 95,000, preferably to 90,000, more preferably to 85,000, and most preferably to 80,000, as measured by gel permeation chromatography (GPC).

The total number average molecular weight ($M_{nt}$) of rigid hydrogenated block copolymers used in the present invention is typically from 24,000, preferably from 30,000, more preferably from 45,000 and most preferably from 50,000 to 150,000, typically to 135,000, generally to 115,000, preferably to 100,000, more preferably to 90,000, and most preferably to 85,000. The $M_{nt}$, as referred to throughout this specification, is determined by gel permeation chromatography (GPC) compared to polystyrene standards prior to hydrogenation. The molecular weight of the rigid hydrogenated block copolymer and properties obtained are dependent upon the molecular weight of each of the hydrogenated polymeric blocks.

The $M_{na}$ of the rigid hydrogenated vinyl aromatic polymer block will typically be from 6,000, preferably from 10,000, more preferably from 15,000 and most preferably from 20,000 to 60,000, preferably to 50,000, more preferably to 45,000 and most preferably to 40,000. The hydrogenated diene polymer block will typically have a $M_{nb}$ from 3,000, preferably from 8,000, more preferably from 10,000, and most preferably from 12,000 to 30,000, preferably to 28,000, most preferably to 25,000 and most preferably to 22,000.

The total number average molecular weight ($M_{nt'}$) of the flexible hydrogenated block copolymers used in the present invention is typically from 30,000, preferably from 45,000, more preferably from 55,000 and most preferably from 60,000 to 150,000, typically to 140,000, generally to 135,000, preferably to 130,000, more preferably to 125,000, and most preferably to 120,000.

The flexible hydrogenated block copolymers will typically have a hydrogenated vinyl aromatic polymer block $M_{na'}$ of from 5,000, preferably from 9,000, more preferably from 11,000, and most preferably from 12,000 to 45,000, preferably to 35,000, more preferably to 25,000 and most preferably to 20,000. The hydrogenated diene polymer block will typically have a $M_{nb'}$ from 12,000, preferably from 27,000, more preferably from 33,000 and most preferably from 36,000 to 110,000, preferably to 100,000, more preferably to 90,000 and most preferably to 80,000.

The hydrogenated block copolymers used in the present invention are produced by the hydrogenation of block copolymers including, but not limited to, triblock, multiblock, tapered block, and star block copolymers such as SBS, SBSBS, SIS, SISIS, SISBS and the like (wherein S is polystyrene, B is polybutadiene and I is polyisoprene). The block copolymers preferably contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone. In addition, blends of any of the aforementioned block copolymers can also be used as well as blends of the block copolymers with their hydrogenated homopolymer counterparts. In other words, a hydrogenated SBS block copolymer can be blended with a hydrogenated SBSBS block copolymer and/or a hydrogenated polystyrene homopolymer. It should be noted here that in the production of block copolymers, small amounts of residual diblock copolymers can be produced.

As is apparent from the foregoing discussion, the hydrogenated vinyl aromatic polymer used herein can be advantageously prepared by hydrogenating the corresponding poly(vinyl aromatic) polymer. Suitable hydrogenation processes are described in U.S. Pat. Nos. 5,352,744 and 5,654,253, herein incorporated by reference.

Additionally, the hydrogenation process can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitriles, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 Angstroms (Å). Therefore, an additional method must be used to measure pores less than 60 Angstroms. One such method is nitrogen desorption according to ASTM D-4641-87 for pore diameters of less than about 600 Angstroms. Therefore, narrow pore size distribution is defined as the requirement that at least 98 percent of the pore volume is defined by pores having pore diameters greater than 300 Angstroms and that the pore volume measured by nitrogen desorption for pores less than 300 Angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight ($M_n$). It is preferable to use supports having higher average pore diameters for the hydrogenation of polymers having higher molecular weights to obtain the desired amount of hydrogenation. For high molecular weight polymers ($M_n$>200,000 for example), the typical desired surface area can vary from 15 to 25 $m^2/g$ and the desired average pore diameter from 3,000 to 4000 Angstroms. For lower molecular weight polymers ($M_n$<100,000 for example), the typical desired surface area can vary from 45 to 85 $m^2/g$ and the desired average pore diameter from 300 to 700 Angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica,* John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica,* John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis,*

"Successful Design of Catalysts" V. 44, pg. 146–158, 1989 and *Applied Heterogeneous Catalysis* pgs. 75–123, Institute Francais du Petrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in $M_n$, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in $M_n$ of 20 percent or more. Preferably, a $M_n$ decrease after hydrogenation will be less than 10 percent. However, polymers such as poly-alpha-methylstyrene or other alpha substituted vinyl aromatic polymers which are more prone to polymer degradation, can tolerate a decrease in $M_n$ of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The hydrogenation reaction vessel is typically purged with an inert gas to remove oxygen from the reaction area. Inert gases include, but are not limited to, nitrogen, helium, and argon, with nitrogen being preferred.

The hydrogenating agent can be any hydrogen producing compound which will efficiently hydrogenate the unsaturated polymer. Hydrogenating agents include, but are not limited, to hydrogen gas, hydrazine and sodium borohydride. In a preferred embodiment, the hydrogenating agent is hydrogen gas.

The extent to which pendant aromatic rings are hydrogenated is dependent upon the polymer being hydrogenated, the amount of catalyst used, the process conditions and the reaction time. Hydrogenation is continued until at least 30% by weight aromatic hydrogenation is achieved. In other words, 30 percent by weight of the original aromatic rings are fully hydrogenated to cycloaliphatic rings. For polymers such as polystyrene and styrene-butadiene copolymers, hydrogenation is preferably continued until at least 70 percent, typically at least 80 percent, preferably at least 95 percent, more preferably at least 98% and most preferably at least 98.5% of the aromatic rings are hydrogenated to form the corresponding cycloaliphatic rings.

The progress of the hydrogenation is easily monitored by measuring the disappearance of the characteristic UV-VIS absorption by the aromatic rings. For example, cyclohexane solutions of polystyrene give a very distinct absorption band for the aromatic ring at about 260.5 nm. This band gives an absorbance of 1.000 with a solution concentration of 0.004980 moles of aromatic per liter in a 1-cm cell. After removing the catalyst via filtration (using a 0.50-micrometer ($\mu$m) TEFLON™ filter, Millipore FHUP047) the hydrogenated vinyl aromatic polymer is placed in a UV cell and the absorbance measured. The absorbance is dependent upon concentration. The hydrogenated vinyl aromatic polymer products are typically measured at higher concentrations since they are not diluted before the absorbance is measured. Since the reaction solution is about 15–30 times more concentrated than the standards, small amounts of residual unsaturation can be accurately measured.

If desired, the hydrogenated vinyl aromatic polymer may be blended with another polymeric material. In addition to the hydrogenated vinyl aromatic polymer, at least one other natural or synthetic polymer may also be present in the composition used to produce the foams of the present invention. Suitable polymeric materials include, but are not limited to, other hydrogenated vinyl aromatic homopolymers or hydrogenated (block) copolymers, including hydrogenated styrene/butadiene or styrene/isoprene block copolymers, thermoplastic polyurethanes, polycarbonates (PC), polyamides, polyethers, poly/vinyl chloride polymers, poly/vinylidene chloride polymers, polyesters, polymers that contain lactic acid residuals, partially or non-hydrogenated block polymers, thermoplastics such as styrene-butadiene block copolymers, polystyrene (including high impact polystyrene), acrylonitrile-butadiene-styrene (ABS) copolymers, styrene-acrylonitrile copolymers (SAN), ABS/PC compositions, polyethylene terephthalate, epoxy resins, ethylene vinyl alcohol copolymers, ethylene acrylic acid copolymers, polyolefin carbon monoxide interpolymers, chlorinated polyethylene, polyolefins, cyclic olefin copolymers (COC's), other olefin copolymers (especially polyethylene copolymers) and homopolymers (e.g., those made using conventional heterogeneous catalysts). Examples include polymers made by the process of U.S. Pat. No. 4,076,698, incorporated herein by reference, other linear or substantially linear polymers and mixtures thereof.

One embodiment relates to the use of compositions comprised of at least one hydrogenated vinyl aromatic polymer and a polyolefin elastomer or plastomer, especially a polyolefin elastomer or plastomer made using a single-site catalyst system (for example, a homogeneously branched ethylene polymer such as a substantially linear ethylene interpolymer or a homogeneously branched linear ethylene interpolymer).

Generally suitable polyolefins include, for example, polyethylene (ethylene homopolymer), ethylene/alpha-olefin interpolymers, alpha-olefin homopolymers, such as polypropylene(propylene homopolymer), alpha-olefin interpolymers, such as interpolymers of polypropylene and an alpha-olefin having at least 4 carbon atoms.

Representative polyolefins include, for example, but are not limited to, substantially linear ethylene polymers, homogeneously branched linear ethylene polymers, heterogeneously branched linear ethylene (including linear low density polyethylene (LLDPE), ultra or very low density polyethylene (ULDPE or VLDPE) medium density polyethylene (MDPE) and high density polyethylene (HDPE)), high pressure low density polyethylene (LDPE), ethylene/acrylic acid (EAA) copolymers, ethylene/methacrylic acid (EMAA) copolymers, ethylene/acrylic acid (EAA) ionomers, ethylene/methacrylic acid (EMAA) ionomers, ethylene/vinyl acetate (EVA) copolymers, ethylene/vinyl alcohol (EVOH) copolymers, polypropylene homopolymers and copolymers, ethylene/propylene polymers, alpha-olefin/vinyl aromatic interpolymers such as ethylene/styrene interpolymers, graft-modified polymers (e.g., maleic anhydride grafted polyethylene such as LLDPE g-MAH), ethylene acrylate copolymers (e.g. ethylene/ethyl acrylate (EEA) copolymers, ethylene/methyl acrylate (EMA), and ethylene/methyl methacrylate (EMMA) copolymers), polybutylene (PB), ethylene carbon monoxide interpolymer (e.g., ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO)), chlorinated polyethylene and mixtures thereof.

Ethylene/styrene interpolymers can also be combined with a hydrogenated vinyl aromatic polymer within the composition used in the present invention. Ethylene/styrene interpolymers are prepared by polymerizing i) ethylene or one or more alpha-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

Ethylene/styrene interpolymers can be substantially random, pseudo-random, random, alternately, diadic, triadic, tetradic or any combination thereof. "Pseudo-random" ethylene/styrene interpolymers are described in U.S. Pat. No. 5,703,187, the disclosure of which is incorporated herein in its entirety by reference. "Random" interpolymers are those in which the monomer units are incorporated into the chain wherein there can exist various combinations of ordering including blockiness where either the aliphatic alpha-olefin monomer (A) or hindered vinylidene monomer (B) or both can be repeated adjacent to one another. "Alternating" ethylene/styrene interpolymers are those in which the aliphatic alpha-olefin monomer (A) and hindered vinylidene monomer (B) occur in repeat alternate sequences on the polymer chain in atactic or stereospecific structures (such as isotactic or syndiotactic) or in combinations of the general formula (AB)n. The term "substantially random" as used herein in reference to ethylene/styrene interpolymers generally means that the distribution of the monomers of the interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Substantially random interpolymers do not contain more than 15 mole percent of the total amount of vinyl or vinylidene aromatic monomer in blocks of vinyl or vinylidene aromatic monomer of more than 3 units. Preferably, the substantially random interpolymer is not characterized by a high degree (greater than 50 mole) of either isotacticity or syndiotacticity.

Suitable α-olefin monomers which are useful for preparing the substantially random ethylene/styrene interpolymer include, for example, α-olefin monomers containing from about 2 to about 20, preferably from about 2 to about 12, more preferably from about 2 to about 8 carbon atoms. Preferred such monomers include ethylene, propylene, butene-1,4-methyl-1-pentene, hexene-1 and octene-1. Most preferred are ethylene or a combination of ethylene with $C_3$–$C_8$ α-olefins.

Suitable vinyl or vinylidene aromatic monomers which can be employed to prepare the substantially random ethylene/styrene interpolymer include, for example, those represented by the following formula:

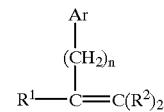

wherein $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; Ar is a phenyl group or a phenyl group substituted with from about 1 to about 5 substituents selected from the group consisting of halo, $C_{1-4}$-alkyl, and $C_{1-4}$-haloalkyl; and n has a value from zero to about 4, preferably from zero to about 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers" in reference to substantially random ethylene/styrene interpolymers, it is meant addition polymerizable vinyl or vinylidene monomers corresponding to the formula:

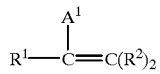

wherein $A^1$ is a sterically bulky, aliphatic or cycloaliphatic substituent of up to 20 carbons, $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; or alternatively $R^1$ and $A^1$ together form a ring system.

By the term "sterically bulky" as used in reference to substantially random ethylene/styrene interpolymers it is meant that the monomer bearing this substituent is normally incapable of addition polymerization by standard Ziegler-Natta polymerization catalysts at a rate comparable with ethylene polymerizations.

With regard to substantially random ethylene/styrene interpolymer, preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random ethylene/styrene interpolymer usually contains from about 5 to about 65, preferably from about 5 to about 55, more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of at least one aliphatic α-olefin having from about 2 to about 20 carbon atoms.

Other optional polymerizable ethylenically unsaturated monomer(s) for substantially random ethylene/styrene interpolymers include strained ring olefins such as norbornene and $C_1$–$C_{10}$-alkyl or $C_6$–$C_{10}$-aryl substituted norbornenes, with an exemplary substantially random interpolymer being ethylene/styrene/norbornene.

The term "polymer", as used herein, refers to a polymeric compound prepared by polymerizing monomers, whether of the same or a different type. As used herein, generic term "polymer" embraces the terms "homopolymer," "copolymer," "terpolymer" as well as "interpolymer."

The term "interpolymer", as used herein refers to polymers prepared by the polymerization of at least two different types of monomers. As used herein the generic term "interpolymer" includes the term "copolymers" (which is usually employed to refer to polymers prepared from two different monomers) as well as the term "terpolymers" (which is usually employed to refer to polymers prepared from three different types of monomers).

The term "homogeneously branched ethylene polymer" is used herein in the conventional sense to refer to an ethylene interpolymer in which the comonomer is randomly distributed within a given polymer molecule and wherein substantially all of the polymer molecules have the same ethylene to comonomer molar ratio. The term refers to ethylene interpolymers that are manufactured using so-called homogeneous or single-site catalyst systems known in the art such Ziegler vanadium, hafnium and zirconium catalyst systems and metallocene catalyst systems e.g., a constrained geometry catalyst systems.

Homogeneously branched ethylene polymers for use in the present invention can be also described as having less than 15 weight percent, preferably less 10 weight percent, more preferably less than 5 and most preferably zero (0) weight percent of the polymer with a degree of short chain branching less than or equal to 10 methyls/1000 carbons. That is, the polymer contains no measurable high density polymer fraction (e.g., there is no fraction having a density of equal to or greater than 0.94 g/cm3), as determined, for example, using a temperature rising elution fractionation (TREF) technique, as described in U.S. Pat. No. 4,798,081, which is incorporated herein by reference, and infrared or 13C nuclear magnetic resonance (NMR) analysis. The homogeneously branched ethylene polymers for use in the invention can be either a substantially linear ethylene polymer or a homogeneously branched linear ethylene polymer. The term "linear" as used herein means that the ethylene polymer does not have long chain branching as described in U.S. Pat. No. 4,076,698 (Anderson et al.), herein incorporated by reference.

The term "homogeneously branched linear ethylene polymer" refers to polymers having a narrow short chain branching distribution and an absence of long chain branching as described in U.S. Pat. No. 3,645,992 (Elston), herein incorporated by reference, and those made using so-called single site catalysts in a batch reactor having relatively high ethylene concentrations (as described in U.S. Pat. 5,026,798 (Canich) or in U.S. Pat. No. 5,055,438 (Canich)) or those made using constrained geometry catalysts in a batch reactor also having relatively high olefin concentrations (as described in U.S. Pat. No. 5,064,802 (Stevens et al.) all of which are incorporated herein by reference.

Typically, homogeneously branched linear ethylene polymers are ethylene/α-olefin interpolymers, wherein the α-olefin is at least one $C_3$–$C_{20}$ α-olefin (e.g., propylene, 1-butene, 1-pentene, 4-methyl-1-pentene, 1-hexene, 1-octene and the like) and preferably the at least one $C_3$–$C_{20}$ α-olefin is 1-butene, 1-hexene or 1-octene. Most preferably, the ethylene/α-olefin interpolymer is a copolymer of ethylene and a $C_3$–$C_{20}$ α-olefin, and especially an ethylene/$C_4$–$C_8$ α-olefin copolymer such as an ethylene/1-octene copolymer, ethylene/1-butene copolymer, ethylene/1-pentene copolymer or ethylene/1-hexene copolymer.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using 13C nuclear magnetic resonance (NMR) spectroscopy and to a limited extent, e.g. for ethylene homopolymers, it can be quantified using the method of Randall, (Rev. Macromol.Chem. Phys., C29 (2&3), p. 285–297 (1989)). However as a practical matter, current 13C nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional 13C nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers as described in U.S. Pat. No. 4,500,648, incorporated herein by reference.

The substantially linear ethylene polymers are further defined in U.S. Pat. No. 5,272,236, application Ser. No. 07/776,130, filed Oct. 15, 1991; U.S. Pat. No. 5,278,272, application Ser. No. 07/939,281, filed Sep. 2, 1992; and U.S. Pat. No. 5,665,800, application Ser. No. 08/730,766, filed Oct. 16, 1996, each of which is incorporated herein by reference.

Substantially linear ethylene polymers are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" as discussed above is used herein to indicate a copolymer, or a terpolymer, or the like, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1 -pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-octene is especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

In one embodiment, the composition used in the present invention comprises at least one hydrogenated vinyl aromatic polymer and at least one polypropylene polymer. Suitable polypropylene polymers for use in the invention, including random block propylene ethylene polymers, are available from a number of manufacturers, such as, for example, Montell Polyolefins and Exxon Chemical Company. At Exxon, suitable polypropylene polymers are supplied under the designations ESCORENE™ and ACHIEVE™.

Suitable poly lactic acid (PLA) polymers for use in the invention are well known in the literature (e.g., see D. M. Bigg et al., "Effect of Copolymer Ratio on the Crystallinity and Properties of Polylactic Acid Copolymers", ANTEC '96, pp. 2028–2039; WO 90/01521; EP 0 515203A; and EP 0 748846A2, the disclosures of each of which are incorporated herein by reference). Suitable poly lactic acid polymers are supplied commercially by Cargill Dow under the designation EcoPLA™.

Suitable thermoplastic polyurethane polymers for use in the invention are commercially available from The Dow Chemical Company under the designation PELLATHANE™.

Suitable polyolefin carbon monoxide interpolymers can be manufactured using well known high pressure free-radical polymerization methods. However, they may also be manufactured using traditional Ziegler-Natta catalysis and even with the use of so-called homogeneous catalyst systems such as those described and referenced herein above.

Suitable free-radical initiated high pressure carbonyl-containing ethylene polymers such as ethylene acrylic acid interpolymers can be manufactured by any technique known in the art including the methods taught by Thomson and Waples in U.S. Pat. No. 3,520,861 and by McKinney et al. in U.S. Pat. Nos. 4,988,781; 4,599,392; and 5,384,373, the disclosures of which are incorporated herein by reference.

Suitable ethylene vinyl acetate interpolymers for use in the invention are commercially available from various suppliers, including Exxon Chemical Company and Du Pont Chemical Company.

Suitable ethylene/alkyl acrylate interpolymers are commercially available from various suppliers. Suitable ethylene/acrylic acid interpolymers are commercially available from The Dow Chemical Company under the designation PRIMACOR™. Suitable ethylene/methacrylic acid interpolymers are commercially available from Du Pont Chemical Company under the designation NUCREL™.

Suitable polyethylene terephthalate polymers include LIGHTER™ available from The Dow Chemical Company.

Chlorinated polyethylene (CPE), especially chlorinated substantially linear ethylene polymers, can be prepared by chlorinating polyethylene in accordance with well known techniques. Preferably, chlorinated polyethylene comprises equal to or greater than 30 weight percent chlorine. Suitable chlorinated polyethylenes for use in the invention are commercially supplied by Dupont Dow Elastomers under the designation TYRIN™.

Suitable polycarbonates are commercially available from various suppliers, including The Dow Chemical Company under the designation CALIBRE®.

Suitable polyamides, such as nylon are commercially available from various suppliers, including ZYTEL™ available from DuPont, CAPRON™ available from Allied and ULTAMID™ available from BASF.

Suitable polyethers are commercially available from various suppliers, including ULTEM™ available from GE Plastics.

Suitable poly/vinyl chloride polymers are commercially available from various suppliers, including ALPHA DURAL™ AND ALPHA available from Alpha Chemical and Plastics, UNICHEM™ available from Colorite Plastics, GEON™ available from B.F. Goodrich.

Suitable poly/vinylidene chloride polymers are commercially available from various suppliers, including SARAN™ available from The Dow Chemical Company.

Suitable polyesters are commercially available from various suppliers, including FIBERCORE™ available from American Cyanamid; AROPOL™ available from Ashland Chemical Company and COREZYN™ available from Interplastic.

Suitable non-hydrogenated styrene-butadiene block copolymers are commercially available from various suppliers, including Dexco under the designation Vector™. Additionally, partially hydrogenated block copolymers can also be used and are well known in the art. Such polymers are easily prepared using hydrogenation catalysts well known in the art. Partially hydrogenated block copolymers include block copolymers having up to 100 percent diene unsaturation and 0 to less than 70 percent aromatic hydrogenation.

Suitable styrenic polymers include syndiotactic and atactic polystyrenes and high impact polystyrene resins which are commercially available from various suppliers, including QUESTRA®, STYRON® and STYRON-A-TECH® available from The Dow Chemical Company.

Suitable ABS resins are commercially available from various suppliers, including MAGNUM® available from The Dow Chemical Company.

Suitable ABS/PC compositions are commercially available from various suppliers, including PULSE® available from The Dow Chemical Company.

Suitable SAN copolymers are commercially available from various suppliers, including TYRIL® available from The Dow Chemical Company.

Suitable ethylene vinyl alcohol copolymers are commercially available from various suppliers, including-ELVANOL™ which is available from DuPont and EVA polymers available from Eval Company of America.

Suitable epoxy resins are commercially available from various suppliers, including D.E.R. resins and D.E.N. resins available from The Dow Chemical Company.

Suitable cyclic-olefin-polymers and copolymers are polymerized cycloolefin monomers exemplified by norbornene-type polymers such as are described in U.S. Pat. Nos. 5,115,041; 5,142,007; 5,143,979; all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. The substituents on the cycloolefin monomers can be any which do not poison or deactivate the polymerization catalyst. Examples of preferred monomers include but are not limited to dicyclopentadiene, methyltetracyclo-dodecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7]dodecene-4, (or ethyl-tetracyclododecene), 9-hexyl-tetracyclo-[6,2,1,13,6O2,7]dodecene-4,9 -decyl-tetracyclo [6,2,1,13,6O2,7]dodecene-4,9-decyl-tetracyclo[6,2,1,13, 6O2,7]dodecene-4,9,10-dimethyl-tetracyclo[6,2,1,13,6O2, 7]dodecene-4,9-methyl-10-ethyl-tetracyclo[6,2,1,13,6O2,7] dodecene-4,9-cyclohexyl-tetracyclo[6,2,1,13,6O2,7] dodecene-4,9-chloro-tetracyclo[6,2,1,13,6O2,7]dodecene-4,9-bromo-tetracyclo[6,2,1,13,6O2,7]dodecene-4,9-fluoro-tetracyclo[6,2,1,13,6O2,7]dodecene-4,9-isobutyl-tetracyclo [6,2,1,13,6O2,7]dodecene4, and 9,10-dichlorotetracyclo[6, 2,1,13,6O2,7]-dodecene-4.

Polymers comprising two or more different types of cyclic olefin monomeric units are also suitable. For example, copolymers of methyltetracyclododecane (MTD) and methylnorbornene (MNB) are especially suitable. More preferably, the polymers comprise three or more different types of monomeric units, e.g., terpolymers, including MTD, MNB and dicyclopentadiene (DCPD).

Any polymeric material which will enhance the properties of a hydrogenated vinyl aromatic polymer or be enhanced by the presence of a hydrogenated vinyl aromatic polymer is useful in the foams of the present invention.

Optionally, compatibilizers may also be used in the composition of the present invention. A compatibilizer typically contains a functional group which is compatible with the hydrogenated vinyl aromatic polymer and an additional functional group which is compatible with the other synthetic or natural polymer. Compatibilizers are well known in the art and one skilled in the art would easily be able to recognize the type of compatibilizer suitable for the desired compositions, if needed.

The compositions used in the present invention typically contain from 0.5, generally from 1, preferably from 3, more preferably from 5 and most preferably from 10 to 99.5, generally to 99, preferably to 97, more preferably to 95 and most preferably to 90 weight percent of the hydrogenated vinyl aromatic polymer based on the total weight of the composition.

In one embodiment of the present invention, the composition comprises more than one hydrogenated vinyl aromatic polymer.

The compositions of the hydrogenated vinyl aromatic polymer and additional polymeric material may be prepared by any suitable means known in the art such as, but not limited to, dry blending in a pelletized form in the desired proportions followed by melt blending in a screw extruder, Banbury mixer or the like. Additionally, the compositions may be prepared by solution mixing the individual polymeric components.

Additives such as antioxidants (for example, hindered phenols such as, for example, Irganox® 1010), phosphites (for example, Irgafos® 168)), U. V. stabilizers, cling additives (for example, polyisobutylene), antiblock additives, slip agents, colorants, pigments, fillers, fire retardants, light and heat stabilizers, extension oils and the like can also be included in the compositions used to produce the foams of the present invention. In-process additives, e.g. calcium stearate, water, and fluoropolymers, may also be used for purposes such as for the deactivation of residual catalyst or for further improved processability.

Any foaming process can be utilized in producing a foam of a hydrogenated vinyl aromatic polymer. Typical processes include extrusion foaming, bead stock foaming and bun stock or compression molded foaming.

Extrusion foaming can be accomplished by melt processing the polymer with a blowing agent to form a foamable mixture, extruding said foamable mixture through an extrusion die to a region of reduced pressure and allowing the foamable mixture to expand and cool to form a polymer foam having a density from 8 to 320 kg/m³. Conventional foam extrusion equipment is entirely suitable for producing the foam. Thus, single screw extruders, twin screw extruders and accumulating extrusion apparatus can all be used. Suitable processes for making extruded foams from resin/blowing agent mixtures are described in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,302,910; 4,421,866; 4,438,224; 4,454,086 and 4,486,550. All of those processes are generally suitable for making extruded foam according to this invention.

In the extrusion process, the hydrogenated vinyl aromatic polymer is heated to a temperature at or above its glass transition temperature, melting point or order disorder transition temperature. Suitable temperatures are at least 230° C., more preferably at least 240° C., most preferably at least 250° C., but preferably no greater than 320° C., more preferably no greater than 310° C. and most preferably no greater than 300° C. The resulting plasticized or melted polymer is admixed with a blowing agent and auxiliary foaming aids as discussed below and extruded though an extrusion die to form the foam product.

Preferably, the temperature of the foamable mixture at the die is in the range 110° C.–220° C., more preferably in the range 120° C.–200° C., most preferably 130° C.–190° C. The foamable mixture is then passed through the die into an area of reduced pressure and temperature zone where the foam expands and cools to form a cellular structure.

The foam can be extruded into any variety of shapes, but will most commonly be extruded to form sheet (nominal thickness of 13 mm or less) or plank (nominal thickness over 13 mm) products or a plurality of coalesced extruded strands or profiles. Coalesced extruder strandfoam products have cross-sectional geometry of the foam structure substantially corresponding to the overall arrangement of the orifices of the die from which the foam composition is extruded. Sheet products are conveniently made using a circular die, producing a tubular foam that is slit to form a flat sheet. Plank products are conveniently made using a rectangular or "dog-bone" die. The foamable mixture is preferably extruded to produce a foam having, before any subsequent fabrication, a cross-sectional thickness of at least 1 mm, more preferably at least 3 mm, most preferably at least 5 mm, up to 200 mm or more. The cross-sectional area of the extruded foam, again prior to fabrication, is preferably at least 6 square centimeters, more preferably at least 15 square centimeters, and most preferably at least 30 square centimeters.

The foam of the present invention may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in Plastic Foams, Part II, Frisch And Saunders, pp. 544–585, Marcel Dekker, Inc. (1973) and Plastic Materials, Brydson, 5th Ed., pp. 426–429, Butterworths (1989).

Expandable and expanded beads can be made by a batch or extrusion process, as disclosed in U.S. Pat. Nos. 4,379,859 and 4,464,484, herein incorporated by reference. The granules are impregnated with a blowing agent in an aqueous suspension or in an anhydrous state in a pressure vessel at an elevated temperature and pressure. The granules are then rapidly discharged into a region of reduced pressure to expand to foam beads, or cooled and discharged as unexpanded beads. The unexpanded beads are then heated to expand with a proper means, e.g., with steam and/or hot air or superheated steam. The extrusion method is essentially the same as the conventional foam extrusion process as described above up to the die orifice. The die has multiple holes. In order to make unfoamed beads, the foamable strands exiting the die orifice are immediately quenched in a cold water bath to prevent foaming and then pelletized. Or, the strands are converted to foam beads by cutting at the die face and then allowed to expand.

The foam beads may then be molded by any means known in the art, such as charging the foam beads to the mold, compressing the mold to compress the beads, and heating the beads such as with steam to effect coalescing and welding of the beads to form an article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229, which are incorporated herein by reference.

In one embodiment, a bead stock foam can be produced by a process comprising:
  a) melt processing a composition comprising a hydrogenated vinyl aromatic polymer and a blowing agent, under pressure,
  b) extruding the composition of a) to form expandable polymer particles; and
  c) exposing the particles to steam or a hot air atmosphere at a temperature between 100 to 160° C., to expand the particles into a foam.

Another process for making expandable thermoplastic beads comprises heating the polymer to form a polymer melt; incorporating a blowing agent into the melt at an elevated temperature to form a foamable gel; cooling the gel to a temperature at which foaming does not occur; extruding the gel to form one or more essentially continuous expandable thermoplastic strand(s); and pelletizing the expandable thermoplastic strand(s) to form expandable thermoplastic bead(s). Alternatively expanded thermoplastic foam beads may be made if, prior to extruding from the die, the gel is cooled to a temperature at or above the polymer glass transition temperature or melting point.

Preferably, the foam of the present invention is a bead stock foam, only if the hydrogenated vinyl aromatic polymer is a copolymer of a hydrogenated vinyl aromatic and a hydrogenated conjugated diene polymer.

The foam may also be used to make foamed films for bottle labels and other containers using either a blown film or a cast film extrusion process. The films may also be made by a co-extrusion process to obtain foam in the core with one or two surface layers, which may or may not comprise hydrogenated vinyl aromatic polymer.

Bun stock foaming, also referred to as compression molded foaming, can also be used to produce the foams of the present invention. Such processes are well known in the art, and described in JP 45-29381. The process comprises kneading foaming agent, foaming co-agent, crosslinking agent and polymer; transferring the kneaded material to a die and sealing under pressure, heating the material to partially decompose the foaming agent crosslinking agent to produce a primary foam having 40–85% of nondecomposed foaming agent. Further foaming can be conducted under reduced pressure at an increased temperature; followed by, further heating to a temperature sufficient to complete decomposition of the remaining foaming agent and crosslinking agent under ambient pressure so as to produce a foamed polymer material with a low density.

In the first step of this process, a portion of the foaming agent is decomposed and gasified at the time of decomposition of the crosslinking agent with or without a coagent, and an intermediate foam product containing 40–85% of undecomposed foaming agent is produced. Subsequently, the intermediate foam is heated to a temperature where decomposition of the non-decomposed foaming agent occurs at ambient pressure so as to produce a foaming material with a low density. When heating at a decomposition temperature, a slight degree of thermal degradation of the surface is likely to occur in the presence of oxygen; thus, heating is conducted for as short a time as possible, or in the absence of oxygen (for example, in an oil bath or in an air-conditioned tank in a nitrogen atmosphere).

The intermediate primary foam undergoes slow expansion based on the low heat conduction of the primary foam product even when, the material is placed directly in a bath or a tank kept at a temperature in the decomposition range of the foaming agent; thus, it forms an adequate porous material without causing destruction of the porous film and is capable of forming a foaming material with a low density.

Any type of blowing agent can be utilized in producing the foam of the present invention. Suitable physical blowing agents include, but are not limited to fluorocarbons, hydrofluorocarbons, and hydrochloro-fluorocarbons, carbon dioxide, nitrogen, lower alkanols and ketones, alkyl chlorides, alkyl ethers, water, and/or hydrocarbons, especially alkanes having up to six carbon atoms. Of particular interest among the fluorocarbons and hydrofluorocarbons are methyl fluoride, difluoromethane (HFC-32), perfluoromethane, ethyl fluoride (HFC-161), 1,1-difluoroethane (HFC-152a), 1,1,1-trifluoroethane (HFC-143a), 1,1,1,2-tetrafluoroethane (HFC-134a), 1,1,2,2-tetrafluoromethane (HFC-134), pentafluoroethane (HFC-125), perfluoroethane, 2,2-difluoropropane (HFC-272fb), 1,1,1-trifluoropropane (HFC-263fb), 1,1,1,3,3-pentafluoropropane (HFC-245fa), heptafluoropropane (HFC-227ca and HFC-227ea), 1,1,1,3,3-pentafluorobutane (HFC-365mfc), perfluoro-propane, perfluorobutane or perfluorocyclobutane. Of particular interest among the hydrochlorofluorocarbons are chlorodifluoromethane (HCFC-22), 1-chloro-1,1-difluoro-ethane (HCFC-142b), 1,1-chloro-1-fluoroethane (HCFC 141b) and 1-chloro-1,3,3,3-tetrafluoroethane (HCFC 124). Hydrocarbon blowing agents include methane, ethane, propane, n-butane, isobutane, n-pentane, isopentane, neopentane, cyclobutane and cyclopentane. Alcohols include methanol, ethanol, n-propanol and isopropanol and ketones include acetone. Suitable alkyl chlorides include methyl chloride, ethyl chloride and isopropyl chloride. Suitable alkyl ethers include dimethyl ether, diethyl ether and methyl ethyl ether. Mixtures of two or more of these physical blowing agents can also be used.

Suitable chemical blowing agents include azodicarbonamide, azodiisobutyronitrile, benzenesulfohydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Any mixture of blowing agents can be used. One preferred blowing agent mixture is a mixture of a primary hydrofluorocarbon or hydrochlorofluorocarbon blowing agent such as, for example, HFC-134a, HFC-134, HFC-152a, HFC-245fa, HFC-365mfc, HCFC-142b, HCFC-22 or HCFC-141b, and optionally carbon dioxide, and a secondary blowing agent comprising one or more of $C_{1-4}$ alcohols or ketones, $C_{2-5}$ hydrocarbons (including linear and cyclic hydrocarbons) alkyl ethers, alkyl halides, or water.

Another preferred blowing agent mixture is a non-halogenated blowing agent mixture comprising a lower alcohol having from 1 to 4 carbon atoms, alkyl ether, alkyl ester, alkyl ketone, hydrocarbons, water (up to 50 percent) and carbon dioxide.

The blowing agent or mixture of blowing agents is used in an amount to provide the foam with a density of from about 3 to 800 kg/m$^3$. This density is typically achieved when at least 0.01 mph (gram-mole of blowing agent per hundred grams of resin), preferably at least 0.04, more preferably at least 0.06 mph, and most preferably at least 0.08 mph; but typically no more than 0.60 mph, preferably no more than 0.4, more preferably no more than 0.3, even more preferably no more than 0.20 mpg, and most preferably no more than 0.16 mph are used. A chemical blowing agent can be used in its natural state or as a concentrate. Typically a chemical blowing agent will be used in amounts of from 0.1, preferably from 0.2 and more preferably from 0.5 to 40, preferably to 20, and most preferably to 15 weight percent of the resin.

The blowing agent or mixture thereof, may be incorporated or mixed into the melt polymer material by any convenient means. Most typically, a physical blowing agent is fed under pressure into a vessel where it mixes with the molten polymer. However, such mixing may be accomplished by a variety of means including so-called static mixers or interfacial surface generators such as are described in U.S. Pat. Nos. 3,751,377 and 3,817,669. Chemical blowing agents can be mixed with the polymer beforehand or fed together with the polymer. Depending on the process, the polymer/blowing agent mixture is then heated to a temperature above the boiling (in the case of a physical blowing agent) or decomposition (in the case of a chemical blowing agent) temperature of the blowing agent to cause expansion. However, under sufficient pressure the resulting foamable mixture will not expand until it is delivered to an area of lower pressure, such as forced through an extrusion die. Typically, the foamable mixture is cooled in an extruder, other mixing device or in a separate heat exchanger to a foaming temperature that permits the formation of a foam having the desired density and desired cell size to an optimum foaming temperature.

Various auxiliary materials can be used in the foaming process. Common auxiliary materials include cell control agents (nucleators), cell enlarging agents, stability control agents (permeability modifiers), antistatic agents, crosslinkers, processing aids (such as slip agents), stabilizers, flame retardants, ultraviolet absorbers, acid scavengers, dispersion aids, extrusion aids, antioxidants, colorants, inorganic fillers and the like. Cell control agents and stability control agents are preferred.

Preferred cell control agents include finely divided inorganic substances such as calcium carbonate, calcium silicate, indigo, talc, clay, titanium dioxide, silica, calcium stearate or diatomaceous earth, as well as small amounts of chemicals that react under extrusion conditions to form a gas, such as a mixture of citric acid or sodium citrate and sodium bicarbonate. The amount of nucleating agent employed may range from about 0.01 to about 5 parts by weight per hundred parts by weight of a polymer resin. The preferred range is from 0.1 to about 3 parts by weight.

When the foam is to be used as thermal insulation, additives that attenuate the infrared transmission through the foam structure can be incorporated to augment its insulation performance, even when the blowing agent includes an insulating gas such as a hydrofluorocarbon or hydrochlorofluorocarbon. Examples of IR attenuators include carbon black materials, graphite, titanium dioxide, aluminum particles, and the like. When IR attenuators are used, a reduced proportion of an insulating blowing agent (i.e., hydrofluorocarbons and hydrochlorofluorocarbons) can be used.

The foam may be subjected to various subsequent processing steps if desired. One such process includes curing the foam (i.e., replace the blowing agent in the cells with air). Process steps intended to reduce the curing time include perforation, as described in U.S. Pat. No. 5,424,016, heating the foam at slightly elevated (100–130° F.) temperatures for a period of days to weeks, or combinations thereof. In addition, the foam may be crushed in order to open cells. Crosslinking steps may also be performed.

The foam preferably has a density before any thermoforming of at least 3 kg/m$^3$, preferably at least 10 kg/m$^3$ and more preferably at least 20 kg/m$^3$; but no greater than 800 kg/m$^3$, preferably no greater than 600 kg/m$^3$, and more preferably no greater than 300 kg/m$^3$, as measured according to ASTM D-1622. The density of the foam is dependent upon the foam production process. Extruded foams and bun stock foams will typically have densities of from 8 to 320 kg/m$^3$. Bead stock foams will have typical densities of from 3 to 100 kg/m$^3$ and injection molded foams will typically have densities of from 100 to 800 kg/m$^3$.

The foam will typically have an average cell size of at least 0.01 mm, preferably at least 0.05 mm, and more preferably at least 0.1 mm; and advantageously no greater than 5 mm, preferably no greater than 4 mm and more preferably no greater than 3 mm, as measured according to ASTM D3576. Most preferred density and cell size ranges will vary depending upon the composition of the foam and desired physical properties. For instance, foam can usually be made more rigid by increasing density or cell size.

The closed cell content of the foam can vary according to the intended end-use application. For thermal insulating and many packaging applications, the foam is advantageously primarily a closed cell foam having at least 70%, preferably at least 85%, closed cells. For thermal insulation applications, the closed cell content is most preferably at least about 95%. When used in packaging and/or thermal insulation applications, the foam will often advantageously have a thin integral skin. For other applications, such as sound insulation or when a soft foam is needed, the closed cell content is advantageously below 70%, preferably below 50% and may be as low as essentially zero. Open (and closed) cell content is determined according to ASTM D2856-A.

A rigid foam preferably has a compressive strength of at least 30 kPa (kiloPascal), more preferably at least 50 kPa, most preferably at least 100 kPa; and a compressive modulus of at least 1 MPa (1×10$^6$ Pa), more preferably at least 2 MPa, and most preferably at least 3 MPa, as measured according to ASTM D-1621. For a flexible foam, the compressive strength can be as low as 1 kPa at 50% deformation.

The foam of the present invention preferably exhibits a heat distortion temperature, as measured according to the test described in Example 1 below, of at least about 105° C., preferably at least 110° C., more preferably at least about 115° C.

Unless crosslinked, the foam article is readily thermoformable or otherwise capable of being shaped under heat and mechanical pressure to a desired shape or contour, depending on the application. If desired, a decorative layer such as a fabric layer of woven thermoplastic fibers may be thermally welded or otherwise adhered to the foam during or after the thermoforming process. The foam may be laminated to other foam structures, films, or other substrates.

The foam of the present invention is adapted for use in various applications. Closed celled foam panels according to the invention are useful as thermal building insulation or to insulate roofing, walk-in refrigerators and freezers, transportation devices, water heaters, storage tanks and the like. They are also useful in other insulation applications. Closed and open cell foams according to the invention can be used in a variety of packaging and cushioning applications such as electronics and consumer goods packaging. Softer foams according to the invention are useful as acoustical insulation. Rigid foams are useful for composite structure elements, lightweight panels and the like.

The following examples illustrate the invention, but are not intended to limit it in any way. All parts and percentages are by weight unless otherwise indicated.

EXAMPLE 1

Preparation of PCHE

A polycyclohexylethylene (PCHE) resin is made by hydrogenating an amorphous polystyrene until over 99.5% of the pendant styrene rings have been hydrogenated to form pendant cyclohexyl groups using the process described in U.S. Pat. No. 5,700,878. The hydrogenated polymer has a $M_w$ of 199,000, an $M_n$ of 88,600, an $M_z$ of 283,000, and a glass transition temperature of 147° C.

Foams: Extrusion Foaming

Five samples (Examples 1A–1E) of extruded foam are produced from the PCHE polymer produced above, using a combined total of 0.4 phr (part per hundred of resin) of barium stearate (an extrusion aid) and copper phthalocyanine (a blue colorant).

For each sample, the polymer, barium stearate and copper phthalocyanine are melted in an extruder zone at a temperature of 260° C. The resulting mixture is fed to a mixer with a 60/40 by weight mixture of HCFC-142b/HCFC-22. The amount of blowing agent varies from 8 to 10 phr (corresponding to a concentration of 0.08 to 0.11 gram-mole per hundred grams of resin) as described in Table 1 below. The mixture is cooled through two heat exchangers to reach a foaming temperature between 170 and 175° C. Foaming occurs at the exit of a die to form sheet or thin plank foam having the thickness described in Table 1.

The density of each of Examples 1A–1E is determined according to ASTM D-1622. The cell size of each is determined according to ASTM D-3576. The compressive strength and the compressive modulus are measured according to ASTM D-1621.

The heat distortion temperature of each foam sample is measured by exposing each sample for one hour to an elevated temperature and then slowly cooling the sample to ambient temperature over two hours. The foam dimensions are determined before and after the heating/cooling treatment. If the dimensional change is less than 2 percent for a given temperature, the foam is considered to be dimensionally stable at that temperature, and the test is repeated using a higher exposure temperature. The highest temperature at which the foam does not fail the test is considered the heat distortion temperature (HDT) of the foam.

The process data and foam properties are presented in Table 1.

TABLE 1

| Example | 1A | 1B | 1C | 1D | 1E |
|---|---|---|---|---|---|
| pph blowing agent | 10 | 10 | 9 | 9 | 9 |
| mph blowing agent | 0.106 | 0.106 | 0.095 | 0.095 | 0.085 |
| Die temperature, °C | 175 | 170 | 170 | 175 | 175 |
| Mixer Pressure, bar | 123 | 155 | 178 | 121 | 155 |
| Die Pressure, bar | 82 | 96 | 94 | 64 | 71 |
| Pressure Drop, bar | 41 | 59 | 84 | 57 | 84 |
| Foam Density, kg/m³ | 57.8 | 68.8 | 64.7 | 64.4 | 66.6 |
| Cell size, mm | 0.05 | 0.09 | 0.12 | 0.11 | 0.14 |
| Foam thickness, mm | 7 | 7.1 | 11.5 | 8 | 12 |
| Compress Str., kPa | | | | | |
| Vertical (V) | 977 | 1038 | 1001 | 953 | 817 |
| Extrusion (E) | ND | ND | 473 | ND | 415 |
| Horizontal (H) | ND | ND | 586 | ND | 463 |
| Compres. Mod, pKa | | | | | |
| Vertical (V) | 22832 | 19679 | 28699 | 31916 | 21518 |
| Fxtrusion (E) | ND | ND | 8111 | ND | 6381 |
| Horizontal (H) | ND | ND | 9512 | ND | 7088 |
| Heat Distort. Temp. | 125° C. | 120° C. | 115° C. | 115° C. | 120° C. |

ND = not determined

The foams exhibit excellent mechanical properties, and the heat distortion temperature ranges from 115° C. to 125° C.

EXAMPLE 2

Foam Examples 2A–2D are made as described in Example 1, with the exception that the blowing agent is isobutane.

TABLE 2

| Example | 2A | 2B | 2C | 2D |
|---|---|---|---|---|
| pph blowing agent | 7 | 6 | 5 | 5.5 |
| mph blowing agent | 0.120 | 0.103 | 0.086 | 0.095 |
| Die temperature, °C | 174 | 174 | 174 | 174 |
| Mixer Pressure, bar | 91 | 122 | 210 | 136 |
| Die Pressure, bar | 56.5 | 81 | 108 | 88 |
| Pressure Drop, bar | 34.5 | 41 | 102 | 48 |
| Foam Density, kg/m³ | 60.6 | 45.7 | 65.7 | 50.6 |
| Cell size, mm | 0.11 | 0.19 | 1.02 | 0.65 |
| Foam thickness, mm | 8.8 | 13 | 15.5 | 15 |
| Compress. Str., kPa | | | | |
| Vertical (V) | 914 | 486 | 754 | 364 |
| Extrusion (E) | ND | 353 | 390 | 262 |
| Horizontal (H) | ND | 338 | 473 | 340 |
| Compres. Mod, pKa | | | | |
| Vertical (V) | 17582 | 18166 | 29646 | 16957 |
| Extrusion (E) | ND | 5486 | 8722 | 6647 |
| Horizontal (H) | ND | 5800 | 11033 | 6873 |
| Heat Distort Temp. | 110° C. | 120° C. | 110° C. | 115° C. |

The product presents very good mechanical properties and excellent dimensional stability.

EXAMPLE 3

PCHE Foam Examples 3A–3D are produced on a ¾-inch (1.9 cm) extruder with barium stearate and colorant being a combined 0.4 phr by weight. Ethanol is used as the blowing agent, at a level indicated in Table 3.

TABLE 3

| Example No. | 3A | 3B | 3C | 3D |
|---|---|---|---|---|
| pph blowing agent | 4.2 | 5.1 | 6.0 | 6.5 |
| mph blowing agent | 0.090 | 0.110 | 0.130 | 0.141 |
| Die temperature, °C | 190 | 175 | 175 | 175 |
| Foam Density, kg/m³ | 145.0 | 55.6 | 45.7 | 33.2 |
| Cell size, mm | 1.20 | 1.90 | 1.40 | 1.22 |
| Foam thickness, mm | 14.7 | 24.0 | 21.1 | 20.0 |

EXAMPLE 4

Foam Examples 4A and 4B are prepared using the process described in Example 3, except that the blowing agent is n-pentane, in the amounts indicated in Table 4.

TABLE 4

| Example | 4A | 4B |
|---|---|---|
| Parts PCHE | 100 | 100 |
| pph blowing agent | 6.5 | 8.0 |
| mph blowing agent | 0.090 | 0.110 |
| Die temperature, °C | 175 | 175 |
| Foam Density, kg/m³ | 74.6 | 68.1 |
| Cell size, mm | 2.0 | 1.8 |
| Foam thickness, mm | 12.6 | 13.5 |

EXAMPLE 5

Foam Examples 5A–5D are prepared using the method described in Example 2, except a 50/50 by weight mixture of ethanol and HFC-134a is used as the blowing agent. The blowing agents are fed into the foaming line at different levels as indicated in Table 5.

TABLE 5

| Example | 5A | 5B | 5C | 5D |
|---|---|---|---|---|
| pph blowing agent | 6.6 | 8.7 | 7.3 | 6.3 |
| mph blowing agent | 0.090 | 0.118 | 0.100 | 0.086 |
| Die temperature, °C | 175 | 175 | 175 | 175 |
| Foam Density, kg/m³ | 57.9 | 46.8 | 57.1 | 55.1 |
| Cell size, mm | 0.49 | 0.03 | 0.05 | 0.23 |
| Foam thickness, mm | 12.6 | 4.9 | 7.1 | 12.4 |

Low density foams are obtained, with cell size ranging from 30 microns to 500 microns.

EXAMPLE 6

A SBSBS (S is styrene, B is butadiene) block copolymer having a ratio of conjugated diene polymer block to vinyl aromatic block of 20:80 is hydrogenated to 99.5% using the method described in U.S. Pat. No. 5,700,878. The total average molecular weight of the hydrogenated polymer is 60,000.

An extruded foam sheet is produced from the hydrogenated block copolymer using a total of 2 pph (part per hundred of resin) of SAFOAM PE-50 (a chemical blowing agent having a decomposition temperature ranging from 165° C. to 204° C. and composed of a sodium bicarbonate, citric acid blended in low molecular polyethylene base resin and is 50% active, available from Reedy International).

The polymer and blowing agent are dry blended and cast into sheet (>10 mils) on a cast film process having temperatures set at 215° C., and casting roll and chill roll temperatures set at 110° C., and the draw rate ranges from 1 to 3 fpm (feet per minute)(30.5–91.4 cm/min.). Foaming occurs at the exit of the die and the resulting foam is rigid with uniform cell size.

EXAMPLE 7

An SBS copolymer having a ratio of conjugated diene polymer block to vinyl aromatic block of 68:32 is hydrogenated to 99.99% using the process described in U.S. Pat. No. 5,700,878, having a total average molecular weight 63,000.

An extruded foam sheet is produced from the hydrogenated block copolymer using a total of 2 pph of SAFOAM PE-50 as described in Example 6.

The polymer and blowing agent are dry blended and cast into sheet (>10 mils) on a cast film process where the temperatures are set at 200° C. and the casting roll and chill roll temperatures are set at 25° C. with a draw rate of from 1 to 3 fpm (feet per minute)(30.5–91.4 cm/min.). Foaming occurs at the exit of the die and the resulting foam with uniform cell size is flexible, resilient, and tough.

EXAMPLE 8
Bun Stock (Compression Molded) Foam

The polymers and blowing agents listed in Table 6 are mixed in a Banbury mixer. The chemical blowing agents are CELOGEN AZ Azo-dicarbonamide decomposable blowing agents from Uniroyal Chemical Co., and SAFOAM from Reedy International. The concentrate is ground and compressed at high pressure into block specimens for bunstock foaming. The compressed block of material is placed between two spacers, transferred to a preheated hydraulic pressure and placed under applied pressure (17.2 MPa for approximately 5 minutes) to thermally activate the chemical blowing agent. The pressure is released, enabling the block to expand instantaneously. The expansion temperature is chosen to optimize foam stability without the need to crosslink; and the appropriate blowing agent is selected to provide adequate gas yield at those temperatures. The density of the foam and the foam cell size are controlled to achieve optimal performance in a number of applications.

TABLE 6

| Polymer | Blowing Agent and Loading | Expansion Temp. (° C.) | Density lb/ft$^3$ (kg/m$^3$) |
|---|---|---|---|
| PCHB | 12 pph CELOGEN AZ | 165 | 6.50 (104.1) |
| Rigid Pentablock[1] | 15 pph CELOGEN OT | 135 | 8.10 (129.7) |
| Flexible Triblock[2] | 20 pph SAFOAM RIC-50 | 135 | 20.2 (323.6) |

[1] a hydrogenated SBSBS block copolymer having Mw of 60,000, 85 percent hydrogenated styrenic block.
[2] a hydrogenated SBS block copolymer having a Mw of 63,000, 32 percent hydrogenated styrenic block.

EXAMPLE 9
$CO_2$ Blown Foam

The polymers from Example 8 are used to produce foam by melt blending. The samples are compression molded to produce $\frac{1}{16}$ inch (1.9 cm) thick specimens that are subsequently placed in a high temperature and pressure stainless steel vessel. After the specimen is placed into the vessel, the system is closed and heated to a specified temperature. The blowing agent, $CO_2$, is metered in until the pressure reaches 24.1 MPa. The vessel content is held at temperature for 2 hours, then depressurized to allow the specimen to expand instantaneously to form fine celled foam. Some foam properties and process condition are set forth in Table 7.

TABLE 7

| Polymer | Foaming Temperature (° C.) | Foam Density lb/ft$^3$ (kg/m$^3$) |
|---|---|---|
| PCHE | 170 | 3.00 (48.1) |
| Rigid Pentablock | 140 | 3.90 (62.5) |
| Flexible Triblock | 140 | 25.0 (400) |

What is claimed is:

1. A foam produced from a composition comprising:
   a hydrogenated vinyl aromatic polymer, produced by hydrogenating a polymer comprising polymerized vinyl aromatic monomer, having an aromatic hydrogenation level of at least 70 weight percent, said foam having a thickness of at least 1 mm and a density of from 3 to 800 kg/m$^3$;
   with the proviso that the foam is a bead stock foam, only if the hydrogenated vinyl aromatic polymer is a copolymer of a hydrogenated vinyl aromatic monomer and a hydrogenated conjugated diene monomer.

2. The foam of claim 1, wherein the aromatic hydrogenation level is at least 95 weight percent.

3. The foam of claim 2, wherein the vinyl aromatic monomer is styrene.

4. The foam of claim 1, wherein said hydrogenated vinyl aromatic polymer is a hydrogenated copolymer of a vinyl aromatic monomer and a conjugated diene monomer.

5. The foam of claim 4, wherein the hydrogenated copolymer is a block copolymer.

6. The foam of claim 5, wherein the block copolymer is a tapered block, radial block, star block, diblock, triblock, tetrablock, pentablock or other multiblock copolymer.

7. The foam of claim 4, wherein the hydrogenated copolymer is a rigid hydrogenated block copolymer characterized by:
   a) a weight ratio of hydrogenated conjugated diene polymer block to hydrogenated vinyl aromatic polymer block of 40:60 or less, based on the total weight of the hydrogenated conjugated diene polymer block and the hydrogenated vinyl aromatic polymer block; and
   b) a total number average molecular weight ($M_{nt}$) of from 24,000 to 150,000, wherein each hydrogenated vinyl aromatic polymer block (A) has a $M_{na}$ of from 6,000 to 60,000 and each hydrogenated conjugated diene polymer block (B) has a $M_{nb}$ of from 3,000 to 30,000.

8. The foam of claim 4, wherein the hydrogenated copolymer is a flexible block copolymer characterized by:
   a) a weight ratio of hydrogenated conjugated diene polymer block to hydrogenated vinyl aromatic polymer block of greater than 40:60, based on the total weight of the hydrogenated conjugated diene and hydrogenated vinyl aromatic polymer blocks; and
   b) a total number average molecular weight ($M_{nt'}$) of from 30,000 to 150,000, wherein each hydrogenated vinyl aromatic polymer block (A) has a $M_{na'}$ of from 5,000 to 45,000 and each hydrogenated conjugated diene polymer block (B) has a $M_{nb'}$ of from 12,000 to 110,000.

9. The foam of claim 4, wherein the conjugated diene monomer is butadiene, isoprene or a copolymer of butadiene and isoprene.

10. The foam of claim 1, wherein the composition additionally comprises an additional polymer.

11. The foam of claim 10, wherein the additional polymer is a hydrogenated vinyl aromatic homopolymer, a hydrogenated copolymer, a thermoplastic polyurethane, a polycarbonate, a polyamide, a polyether, a poly/vinyl chloride polymer, a poly/vinylidene chloride polymer, a polyester, a polymer that contains lactic acid residuals, a partially hydrogenated or non-hydrogenated block copolymer, a polystyrene, an acrylonitrile-butadiene-styrene (ABS) copolymer, a styrene-acrylonitrile copolymer, an ABS/PC blend, a polyethylene terephthalate, an epoxy resin, an ethylene vinyl alcohol copolymer, an ethylene acrylic acid copolymer, a polyolefin carbon monoxide interpolymer, a chlorinated polyethylene, a polyolefin, a cyclic olefin copolymer, or an olefin copolymer.

12. The foam of claim 11, wherein the additional polymer is a polyolefin.

13. The foam of claim 11, wherein the additional polymer is a hydrogenated vinyl aromatic homopolymer.

14. The foam of claim 11, wherein the composition comprises from 0.5 to 99.5 weight percent of the hydrogenated vinyl aromatic polymer.

15. The foam of claim 1 which has a heat distortion temperature of at least 105° C.

16. The foam of claim 1 produced by an extrusion foaming process.

17. The foam of claim 16 which is a strandfoam.

18. The foam of claim 1 produced by a bead stock foaming process.

19. The foam of claim 1 produced by a bun stock foaming process.

* * * * *